US008437904B2

(12) United States Patent
Mansouri et al.

(10) Patent No.: US 8,437,904 B2
(45) Date of Patent: May 7, 2013

(54) SYSTEMS AND METHODS FOR HEALTH MONITORING OF COMPLEX SYSTEMS

(75) Inventors: Ali R. Mansouri, Bothell, WA (US); John L. Vian, Renton, WA (US); Krzysztof Wojtek Przytula, Malibu, CA (US); David Allen, Westlake Village, CA (US)

(73) Assignee: The Boeing Company, Chicago, IL (US)

( * ) Notice: Subject to any disclaimer, the term of this patent is extended or adjusted under 35 U.S.C. 154(b) by 853 days.

(21) Appl. No.: 11/864,717

(22) Filed: Sep. 28, 2007

(65) Prior Publication Data

US 2008/0312783 A1 Dec. 18, 2008

Related U.S. Application Data

(60) Provisional application No. 60/943,476, filed on Jun. 12, 2007.

(51) Int. Cl.

| | |
|---|---|
| ***G01M 17/00*** | (2006.01) |
| ***G06F 11/30*** | (2006.01) |
| ***B64D 17/00*** | (2006.01) |
| ***G05B 9/02*** | (2006.01) |

(52) U.S. Cl.
USPC ............. 701/29.1; 702/183; 244/152; 700/79

(58) Field of Classification Search ................ 701/1–18, 701/29, 30, 34, 45, 46, 49, 59, 103, 104, 701/108, 112; 455/345; 73/178 R; 702/181, 702/183, 3, 179; 713/300; 342/63, 385; 324/500; 700/79; 705/7
See application file for complete search history.

(56) References Cited

U.S. PATENT DOCUMENTS

| | | | | |
|---|---|---|---|---|
| 5,951,611 | A * | 9/1999 | La Pierre | 701/32.1 |
| 6,208,955 | B1 * | 3/2001 | Provan et al. | 703/20 |
| 2003/0167111 | A1 * | 9/2003 | Kipersztok et al. | 701/29 |
| 2004/0111197 | A1 | 6/2004 | Kipersztok et al. | |
| 2004/0153864 | A1 | 8/2004 | Longere | |
| 2005/0028033 | A1 | 2/2005 | Kipersztok et al. | |
| 2005/0049832 | A1 | 3/2005 | Gorinevsky | |
| 2005/0160324 | A1 | 7/2005 | Przytula et al. | |
| 2006/0149519 | A1 | 7/2006 | Keller | |
| 2007/0088570 | A1 | 4/2007 | Shetty et al. | |

FOREIGN PATENT DOCUMENTS

| | | | |
|---|---|---|---|
| DE | 10332202 | A1 | 2/2005 |
| EP | 1236986 | A2 | 9/2002 |
| WO | WO2007086981 | A2 | 8/2007 |

OTHER PUBLICATIONS

UK Combined Search and Examination Report for UK Application No. GB0810726.0, mailed on Jul. 31, 2008, 4 pgs.

* cited by examiner

*Primary Examiner* — Muhammad Shafi
(74) *Attorney, Agent, or Firm* — Caven & Aghevli LLC

(57) ABSTRACT

Systems and methods for health monitoring of complex systems are disclosed. In one embodiment, a method includes receiving a plurality of signals indicative of observation states of plurality of operating variables, performing a combined probability analysis of the plurality of signals using a diagnostic model of a monitored system to provide a health prognosis of the monitored system, and providing an indication of the health prognosis of the monitored system. In some embodiments, the monitored system may be an onboard system of an aircraft.

16 Claims, 7 Drawing Sheets

| | Field | Variable Name | Total | Count | Missing | Unique Values | Min | Max | Avg | Sum | StDev | Var |
|---|---|---|---|---|---|---|---|---|---|---|---|---|
| 3 | 0 | [Key] | 706752 | 706752 | 0 | 706752 | 1 | 706768 | 353381.0937 | 2.49753E+11 | 204025.5003 | 41626404787 |
| 4 | 1 | [Frame Nr] | 706752 | 176680 | 530072 | 16991 | 1 | 16991 | 6890.044583 | 1217333077 | 4334.981759 | 18792086.85 |
| 5 | 2 | [GMT HO URS 0] | 706752 | 706752 | 0 | 24 | 0 | 23 | 10.92000 | 7717774 | 7.114204 | 50.612008 |
| 6 | 3 | [GMT MI NUTES 0] | 706752 | 706752 | 0 | 60 | 0 | 59 | 29.809435 | 21067878 | 17.320955 | 300.015485 |
| 7 | 4 | [GMT SE CONDS 0] | 706752 | 706752 | 0 | 60 | 0 | 59 | 29.494083 | 20845002 | 17.318204 | 299.920186 |
| 8 | 5 | [MONTH 0] | 706752 | 176690 | 530062 | 2 | 7 | 8 | 7.282908 | 1286817 | 0.450413 | 0.202872 |
| 9 | 6 | [DAY 0] | 706752 | 176690 | 530062 | 18 | 1 | 31 | 17.282042 | 3053564 | 10.17552 | 103.541198 |
| 10 | 7 | [YEAR 0] | 706752 | 176680 | 530072 | 1 | 99 | 99 | 99 | 17491320 | 0 | 0 |
| 11 | 8 | [COMPUT ED AIR SPEED 0] | 706752 | 706752 | 0 | 2380 | 30 | 330.5 | 249.41226 | 176272613.6 | 77.734851 | 6042.707063 |
| 12 | 9 | [ALTITU DE (10 13) 0] | 706752 | 706752 | 0 | 39416 | -197 | 41049 | 28895.3121 | 20421607592 | 13908.27655 | 193440156.6 |
| 13 | 10 | [N1 (LE FT) 0] | 706752 | 706752 | 0 | 2937 | 0 | 94.594 | 74.546321 | 52685761.75 | 23.308754 | 543.298012 |
| 14 | 11 | [N1 (RI GHT) 0] | 706752 | 706752 | 0 | 2982 | 0 | 95.888 | 74.233143 | 52462301.88 | 23.87018 | 580.276495 |
| 15 | 12 | [N2 (LE FT) 0] | 706752 | 706752 | 0 | 2884 | 0 | 99.875 | 83.434953 | 58967819.91 | 15.414836 | 237.61717 |
| 16 | 13 | [N2 (RI GHT) 0] | 706752 | 706752 | 0 | 2864 | 0 | 100.25 | 83.09748 | 58729310.35 | 15.753909 | 248.185661 |
| 17 | 14 | [N3 SEL ECTED 0 L] | 706752 | 706752 | 0 | 2628 | 0 | 89.031 | 85.136153 | 60170146.43 | 11.056876 | 122.254515 |

36

SYSTEMS AND METHODS FOR HEALTH MONITORING OF COMPLEX SYSTEMS

CROSS REFERENCE TO RELATED APPLICATIONS

This patent application claims priority under 35 U.S.C. §120 from U.S. Provisional Application No. 60/943,476 filed Jun. 12, 2007, which provisional application is incorporated herein by reference.

FIELD OF THE DISCLOSURE

The present disclosure relates generally to health monitoring of complex systems, including systems and subsystems of aircraft, watercraft, land-based vehicles, spacecraft, manufacturing equipment, and other suitable systems.

BACKGROUND

Advanced complex systems, such as commercial aircraft systems, typically include a very large number of components which closely interact with each other. As the cost of electronic and computer hardware decreases, these complex systems may be equipped with increasing numbers of sensors, detectors and computerized controllers. Such monitoring devices may provide valuable information that may be used for monitoring and characterizing the health of complex systems.

System health monitoring is a form of system diagnosis in which a system failure is detected, and a component that is responsible for the failure is identified. In monitoring, the diagnosis is based only on observations derived from signals originating from built-in sensors and detectors (e.g. pressure sensors, valve position detectors, etc.). System health monitoring does not take into account the symptoms of failure (e.g. abnormal sounds or vibrations, measurements performed by means of external devices such as portable testers, etc.). Although health monitoring is limited to built-in devices, it has an advantage of providing real-time health status either during operation of the complex system (e.g. during a flight) and/or soon after its completion. For example, in the context of a commercial aircraft, health monitoring may be very useful for a "go-no-go" decision at the airport gate, and may be important in other types of situations involving safety and preventing damage to expensive hardware.

Although desirable results have been achieved using known methods and systems for monitoring the health of complex systems, there is room for improvement. For example, although the proliferation of monitoring devices enables the health of a system to be monitored with improved accuracy, the complexity of health monitoring solutions also rapidly increases. Therefore, systems and methods that accurately and efficiently interpret and characterize system health using information from a large number of monitoring devices would have utility.

SUMMARY

Embodiments of health monitoring systems and methods in accordance with the present disclosure may provide improved health monitoring of complex systems. More specifically, such embodiments may interpret and characterize system health using information from a large number of monitoring devices more accurately and efficiently than conventional health monitoring techniques, and may result in improved operations and reduced costs associated with maintenance and repairs of vehicles and equipment.

In one embodiment, a method of evaluating a condition of a monitored system includes receiving a plurality of signals indicative of observation states of a plurality of operating variables, wherein the monitored system includes an onboard system of an aircraft; performing a combined probability analysis of the plurality of signals using a diagnostic model of the monitored system to provide a health prognosis of the monitored system; and providing an indication of the health prognosis of the monitored system. The method may further include predicting a failure of the monitored system based on the health prognosis. In some embodiments, the monitored system may be an onboard system of an aircraft (e.g. an engine bleed pre-cooler of an environmental control system).

In another embodiment, a method of evaluating a condition of a monitored system includes developing a diagnostic model configured to determine a probability of failure of the monitored system based on one or more observation states of a plurality of operating variables; receiving a plurality of signals indicative of observation states of one or more of the plurality of operating variables, wherein the monitored system includes an onboard system of an aircraft; performing a combined probability analysis using the diagnostic model and at least a portion of the plurality of signals to provide a health prognosis of the monitored system, the health prognosis being indicative of a likelihood of failure of the monitored system; and providing an indication of the health prognosis of the monitored system.

In a further embodiment, a system configured to evaluate a condition of a monitored system includes an input component configured to receive a plurality of signals indicative of observation states of a plurality of operating variables; and an analysis component coupled to the input component and configured to perform a combined probability analysis of the plurality of signals using a diagnostic model of the monitored system to provide a health prognosis of the monitored system, wherein the monitored system includes an onboard system of an aircraft; and provide an indication of the health prognosis of the monitored system.

Further areas of applicability will become apparent from the description provided herein. It should be understood that the description and specific examples are intended for purposes of illustration only and are not intended to limit the scope of the present disclosure

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods for health monitoring of complex systems are described herein. Many specific details of certain embodiments are set forth in the following description and in FIGS. 1-13 to provide a thorough understanding of such embodiments. One skilled in the art will understand, however, that the invention may have additional embodiments, or that alternate embodiments may be practiced without several of the details described in the following description.

In general, embodiments of health monitoring systems and methods in accordance with the present disclosure may involve two phases. In a first phase, diagnostic observations are derived from health monitoring information provided by monitoring components embedded within a monitored system (e.g. sensors, detectors, etc). Such diagnostic observations may include receiving and identifying signals that individually or in combination provide an indication of a component failure. In a second phase, diagnostic models are created, including the development of algorithms which analyze selected signals from monitoring components, and in turn provide health diagnostic information. The diagnostic models developed in the second phase may include embodiments of graphical probabilistic models known as Bayesian networks. The diagnostic models may advantageously capture relations between diagnostic observations and component failure modes. A probabilistic reasoning engine may then be used to derive the likelihood of component failure given the state of the diagnostic observations.

Figure 1:
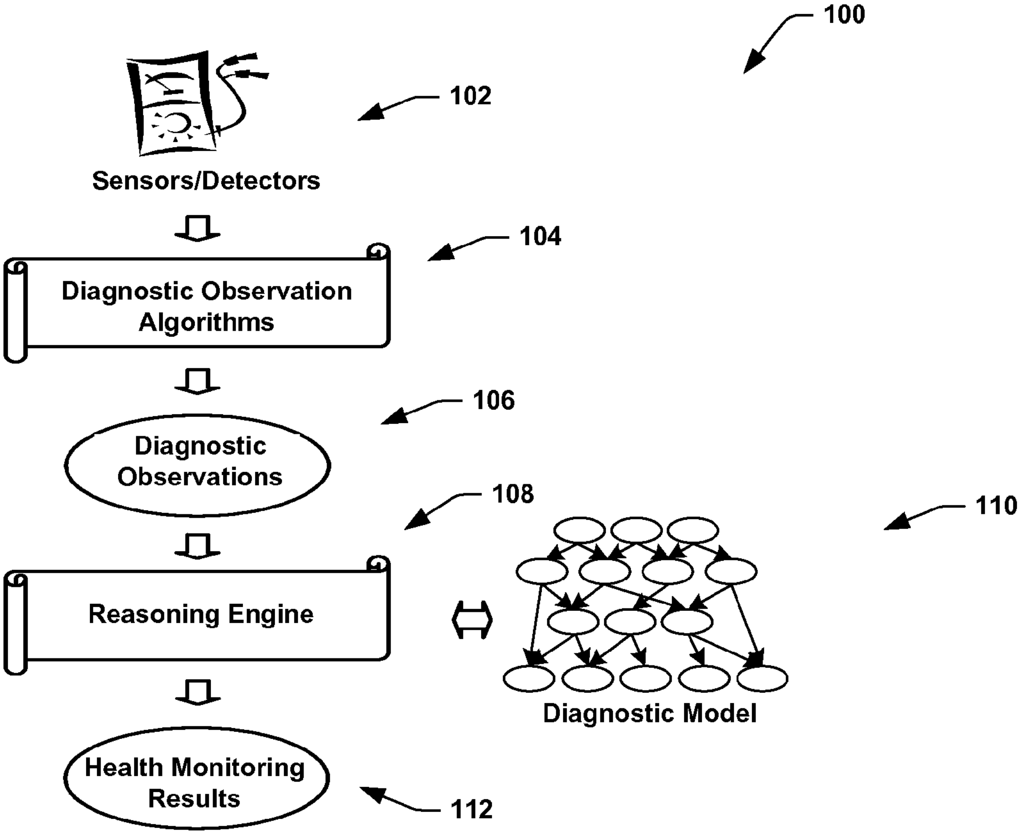
FIG. 1 is a schematic view of a method of monitoring health of a complex system in accordance with an embodiment of the present disclosure.

FIG. 1 is a schematic view of a method 100 of monitoring health of a complex system in accordance with an embodiment of the present disclosure. In this embodiment, the method 100 includes receiving data from one or more sensors (or detectors) disposed within the complex system at 102. At 104, diagnostic observation algorithms are used to analyze the received sensor data, and diagnostic observations are provided at 106. The diagnostic observations are then received and processed by a reasoning engine at 108, which relies upon pre-determined diagnostic models of the complex system 110. Finally, health monitoring results are output by the reasoning engine at 112.

In operation, the definitions of the diagnostic observation algorithms (at 104) and the diagnostic model (at 110) are obtained from the received data and domain knowledge (at 102). The diagnostic observations (at 106) are computed using the diagnostic observation algorithms (at 104) and one or more signals received from the sensors and detectors (at 102). The computations by the reasoning engine (at 108) extract from the raw signals the information useful for diagnosing component failures (at 112). A simple example of such a processing is smoothing of a signal by filtering, followed by comparison of the value to a predefined threshold. The observation derived from the signal may take two states: "high" when the filtered signal is above the threshold, and "normal" when it is below the threshold. Various aspects of the health monitoring method 100 of FIG. 1 are described more fully below.

As noted above, the development of health monitoring solutions may begin with the collection of data from monitoring sensors (at 102) and knowledge about the complex system. Typically, the data are sampled values of one or more pertinent signals from one or more sensors within the complex system over an extended period of time (i.e. empirical data), however, in alternate embodiments, the data may include empirical data, semi-empirical data, and analytically-derived (or predicted) data. For example, for an aircraft system, the data for tens to hundreds of flights may be used. The data may desirably contain signals documenting failure modes of the system components, including annotations indicating when and what failure occurred. Data on component reliability may also be very beneficial. The information about the complex system that is being monitored typically includes a diagram or schematic, and a functional description. Alternatively system knowledge may be acquired directly from an expert or person knowledgeable about the particular complex system being monitored.

In some embodiments, it may be necessary to select signals that are pertinent to health monitoring of the system from all the signals available. In such a selection, understanding of the system and of the signal data may be used. The understanding of the monitored system's operation helps in focusing on a candidate subset of signals. The subset may include signals that appear unrelated, but may be useful in detecting abnormal system behavior (e.g. monitoring an aircraft engine by selecting equivalent signals for another aircraft engine).

In addition, an understanding of the signal data can be significantly improved by visualization of the signals with the failure annotations. The visual inspection may also help in identifying errors and noise in the data (e.g. dropped signals, spikes, etc.). The visualization can be implemented in a commercially-available tool, such as Matlab by The Mathworks, Inc. of Natick, Mass. For manipulation of the data (e.g. selection of individual signals and fragments of signal history), a database and database management tool may be used, such as SQL Server commercially-available from Microsoft Corp. of Redmond, Wash.

The cleaning of data and preprocessing for visualization may be implemented using above-referenced database tool, as well as data mining tools such as the Data Mining Tools available from Microsoft. Such tools typically contain routines such as min, max, average and various forms of filtering. To develop diagnostic observation algorithms, it may be necessary to process and visualize multiple signals at a time.

Figure 2:
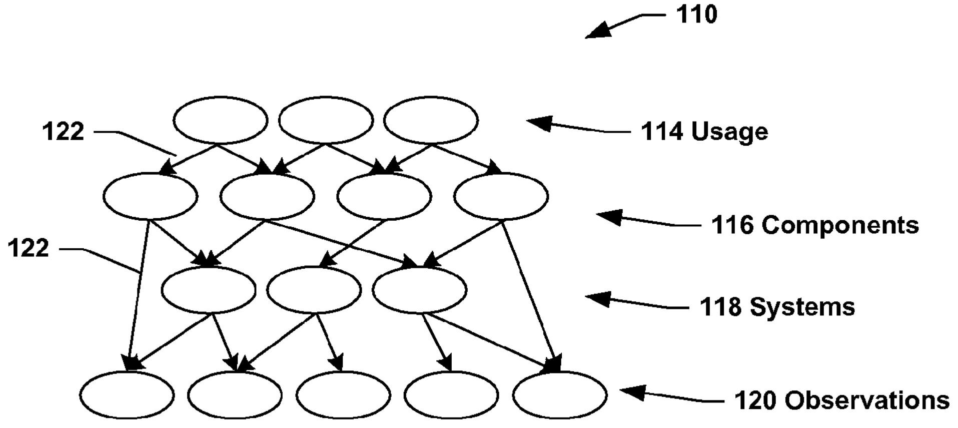
FIG. 2 is a schematic view of a diagnostic model of the health monitoring method of FIG. 1.

FIG. 2 is a schematic view of a diagnostic model 110 that may be used in the health monitoring method 100 of FIG. 1. In this embodiment, a Bayesian network is used as the diagnostic model 110. The diagnostic model 110 may be an annotated graph, whose nodes represent elements of the domain. Specifically, the elements of the domain may include measures of usage 114, components 116, systems 118, and diagnostic observations 120. Directed links 122 between the nodes encode relations, i.e. a link 122 between a given component node 116 (a parent) and a given observation node 120 (a child) indicates that failures of the component 116 result in a change of the state of observation 120. The annotations are conditional probabilities, which represent the strength of the relations. In the embodiment shown in FIG. 2, the diagnostic model 110 is a layered Bayesian network, which may generally be easier to create and less demanding computationally than other possible embodiments.

The diagnostic model 110 may be used to obtain the probability of component failure given the states of the diagnostic observations. More specifically, the diagnostic model 110 may represent a joint probability distribution Pr over the variables $X_1, X_2, \ldots, X_n$, which according to the chain rule is computed as:

$$Pr(X_1,X_2,\ldots,X_n)=Pr(X_n|X_{n-1},\ldots X_2,X_1)*\ldots*Pr(X_2|X_1)*Pr(X_1) \quad (1)$$

For a Bayesian network, this rule can be written as:

$$Pr(X_1, X_2, \ldots, X_n) = \prod_{i=1}^{n} Pr(X_i \mid Pa_i) \quad (2)$$

where $Pa_i$ represents all parent nodes of the node $X_i$. The reasoning engine 108 uses formulae as shown in Equation (2) above, and produces the probability of component failure given the observation states (i.e. system diagnosis).

In some embodiments, methods and systems for health monitoring in accordance with the present disclosure may be used for real-time health monitoring, in which a new sample of signals is processed as soon as it is available and updated health results are immediately available. Alternately, health monitoring may be performed using data collected over an extended period of time, and wherein the health monitoring results are computed in a "batch" processing mode for all the collected data. For example, in the case of aircraft health monitoring, the batch results could be available at the end of a flight phase (e.g. take off), or at the end of an entire flight. The choice of the scenario depends on the monitoring requirements for a specific system, as well as capabilities of the on-board hardware. In general, the terms "operational information" and "operational data" may be used herein to refer to any kind of information and data that are generated during actual operation of a monitored system, such as an aircraft system or subsystem, without regard to whether the information or data are generated in flight, on the ground (e.g. taxiing, etc.), during testing (e.g. laboratory testing, field testing, flight testing, etc.), or during any other possible time.

Embodiments of health monitoring techniques in accordance with the present disclosure will now be described with reference to a particular complex system. Specifically, the application of health monitoring systems and methods will now be discussed for an air supply control system. In most aircraft, the air supply control system (ASCS) provides air to the cabin and flight deck. Typically, the ASCS bleeds air from the aircraft engine compressors for this purpose and uses a heat exchanger (or pre-cooler) to control the air temperature. The ASC system provides air to several other aircraft systems including the passenger cabin air conditioning system. There may be over a hundred different signals available in a typical aircraft, which are of potential utility in monitoring this system's health. Real-time monitoring of the signals results in tens of thousands of data records per flight.

Figure 3:
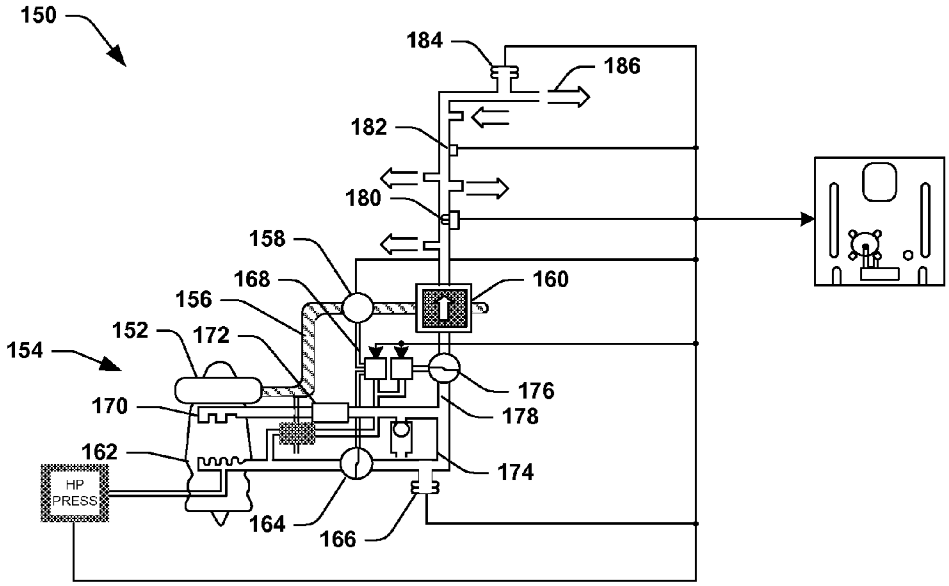
FIG. 3 is a diagram of an aircraft engine air supply system having a health monitoring system in accordance with an embodiment of the present disclosure.

FIG. 3 is a schematic view of an air supply control system 150 that may be monitored in accordance with the present disclosure. In this embodiment, the ASC system 150 receives air flow from an engine fan 152 of an aircraft engine 154. Fan air 156 may pass through a fan air modulating (FAM) valve 158 to a pre-cooler 160. Air leaving a high pressure stage 162 through a high pressure shutoff (HPS) valve 164 passes an intermediate pressure sensor 166. The FAM valve 158 and HPS valve 164 are controlled by a high pressure/fan air controller 168. Air from an intermediate pressure stage 170 may pass through an intermediate pressure check valve 172 and may bypass a duct vent valve 174. Air from the intermediate pressure stage 170 and from the high pressure stage 162 may also enter the pre-cooler 160 through a pressure regulating and shutoff (PRS) valve 176. The PRS valve 176 is controlled by a PRS controller 178. Air leaving the pre-cooler 160 passes a manifold dual temperature sensor 180 and a manifold flow sensor 182. A manifold pressure sensor 184 senses pressure of air that passes to user systems 186.

Figure 4:
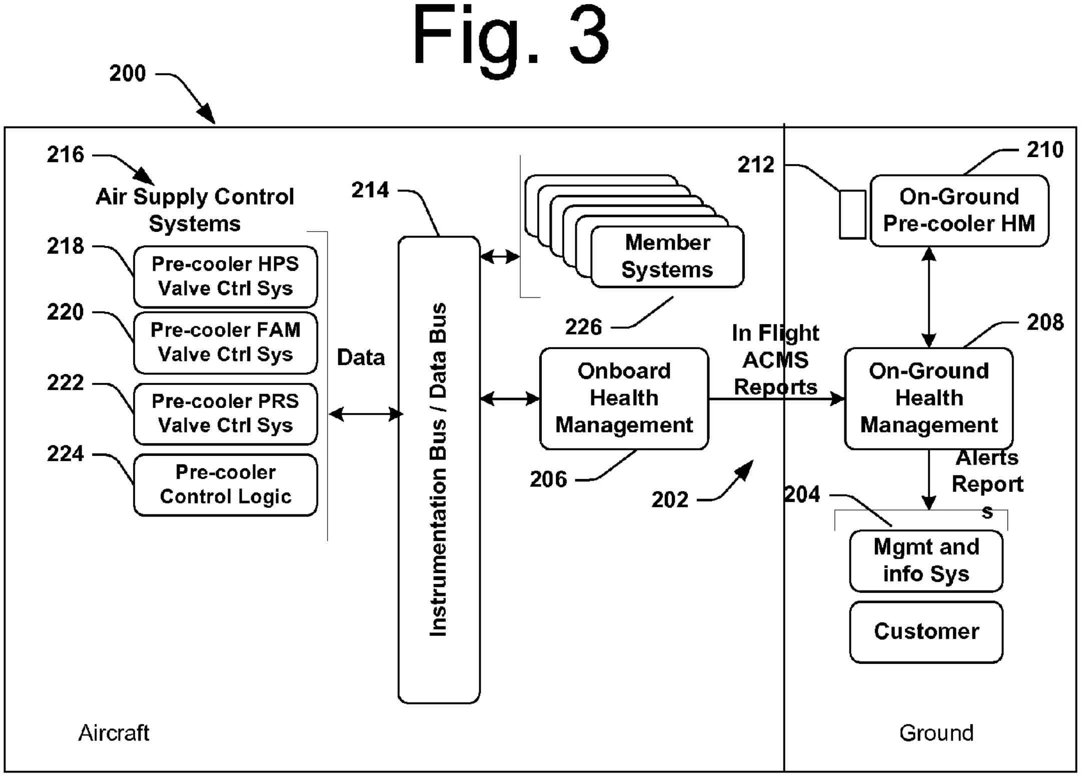
FIGS. 4-6 are schematic views of systems for monitoring and evaluating a health condition of an aircraft engine precooler in accordance with various alternate implementations of the present disclosure.
Figure 5:
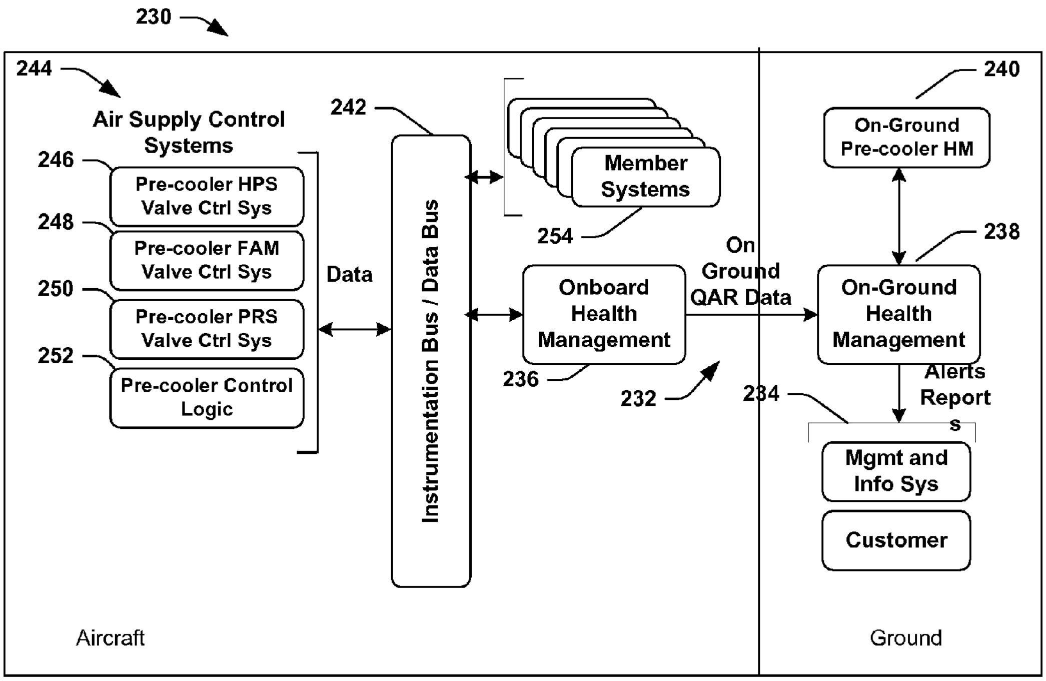

Various pre-cooler health management system configurations may be provided, for example, to accommodate in-service and/or future aircraft. Three exemplary configurations of systems for monitoring and evaluating the condition of an aircraft engine pre-cooler are described below with reference to FIGS. 4, 5, and 6. FIGS. 4 and 5 show configurations appropriate for installation in in-service aircraft, for example, in the 777-aircraft commercially-available from The Boeing Company of Chicago, Ill. The pre-cooler health management configurations shown in FIGS. 4 and 5 may be implemented in existing aircraft without requiring changes to the aircraft.

As shown in FIG. 4, a monitoring system 200 includes a health management system 202 configured to report health conditions of the aircraft to a ground reporting system 204. The health management system 202 includes an onboard subsystem 206 and a ground subsystem 208. An on-ground pre-cooler health management system 210 for evaluating the condition of one or more engine pre-coolers includes at least one processor and memory 212 configured to collect operational data representative of a plurality of signals of the aircraft. As further described below, the pre-cooler health management system 210 analyzes the operational data relative to a set of pre-cooler operational characteristics to determine a health status of the pre-cooler. Based on the pre-cooler health status, the system 210 predicts a failure of the pre-cooler and reports the prediction to the health management system 202.

It should be noted that although the processor and memory 212 are shown in FIG. 4 as being included within the pre-cooler health management system 210, other configurations are possible in which the processor and memory 212 are included in one or more other components of the monitoring system 200 and used by the pre-cooler health management system 210. Of course, other or additional configurations are contemplated in which more than one processor and/or memory is used by the system 210. It should be noted generally that a "processor and memory" may be of many different forms, including but not limited to those previously mentioned. It also should be noted generally that in various embodiments in accordance with the present disclosure, operational data may include data collected during flight and/or data collected while an aircraft is on the ground.

As further shown in FIG. 4, the onboard health management subsystem 206 receives, via a bus 214, data from a plurality of air supply control systems 216, including a pre-cooler HPS valve control system 218, a pre-cooler FAM valve control system 220, a pre-cooler PRS valve control system 222, and pre-cooler control logic 224 (e.g. from an environmental control system). The onboard health management subsystem 206 also receives information from other systems 226 pertaining to other components of the aircraft. During flight, the onboard health management subsystem 206 may download aircraft condition monitoring system (ACMS) reports to the ground subsystem 208. Such reports may include information from the air supply control systems 216. The pre-cooler health management system 210 analyzes the operational data in the ACMS reports relative to a set of pre-cooler operational characteristics to determine the pre-cooler health status.

Similarly, in an alternate embodiment shown in FIG. 5, a monitoring system 230 includes a health management system 232 configured to report health conditions of the aircraft to a ground reporting system 234. The health management system 232 includes an onboard subsystem 236 and a ground subsystem 238. An on-ground pre-cooler health management system 240 for evaluating the condition of one or more engine pre-coolers includes at least one processor and memory configured to collect operational data representative of a plurality of signals of the aircraft. As further described below, the pre-cooler health management system 240 analyzes the operational data relative to a set of pre-cooler operational characteristics to determine a health status of the pre-cooler. Based on the pre-cooler health status, the system 240 predicts a failure of the pre-cooler and reports the prediction to the health management system 232.

The onboard health management subsystem 236 receives, via a bus 242, data from a plurality of air supply control systems 244, including a pre-cooler HPS valve control system 246, a pre-cooler FAM valve control system 248, a pre-cooler PRS valve control system 250, and from ECS pre-cooler control logic 252. The onboard health management subsystem 236 also receives information from other systems 254 pertaining to other components of the aircraft. During flight, data relating to conditions of components of the aircraft are recorded in a quick access recorder (QAR) (not shown). When the aircraft is on the ground, the subsystem 236 transmits QAR reports to the ground subsystem 238. The reports may include information from the air supply control systems 244. The pre-cooler health management system 240 analyzes the operational data in the QAR reports relative to a set of pre-cooler operational characteristics to determine the pre-cooler health status.

Figure 6:
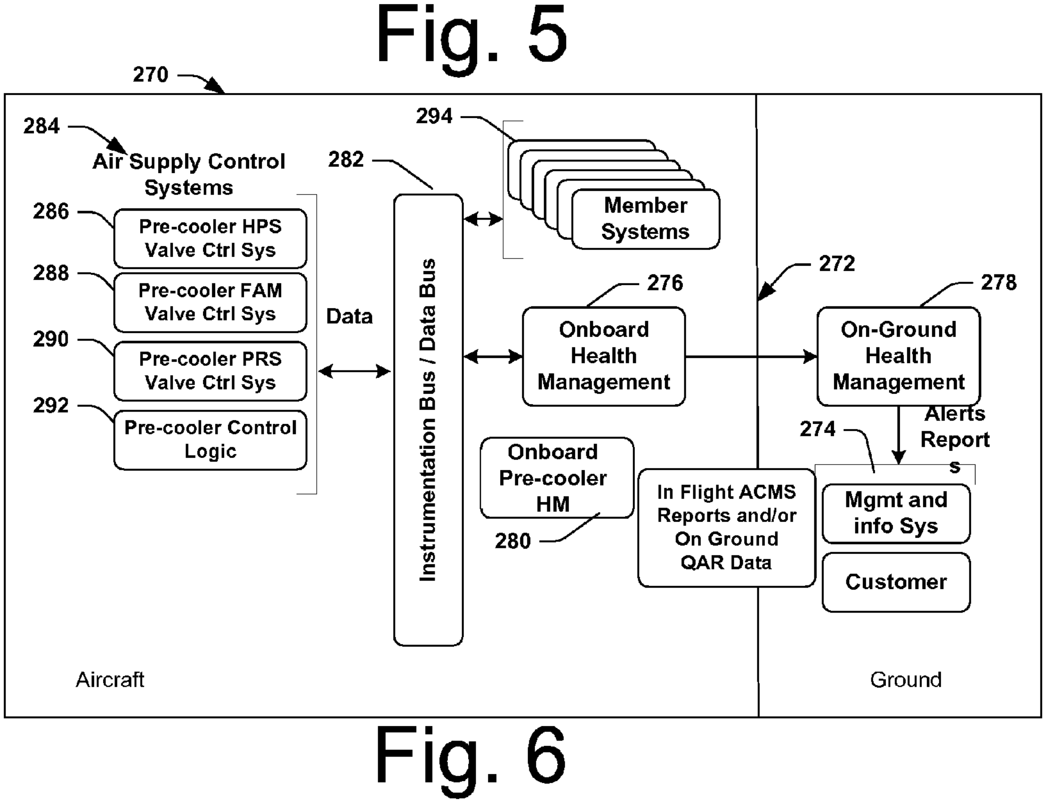

In yet another embodiment shown in FIG. 6, a monitoring system 270 includes a health management system 272 configured to report health conditions of the aircraft to a ground reporting system 274. The health management system 272 includes an onboard subsystem 276 and a ground subsystem 278. An onboard pre-cooler health management system 280 for evaluating the condition of one or more engine pre-coolers includes at least one processor and memory configured to collect operational data representative of a plurality of signals of the aircraft. As further described below, the pre-cooler health management system 280 analyzes the operational data relative to a set of pre-cooler operational characteristics to determine a health status of the pre-cooler. Based on the pre-cooler health status, the system 280 predicts a failure of the pre-cooler and reports the prediction to the health management system 272. The onboard pre-cooler health management system 280 may activate a service indicator, e.g., in a flight deck or cockpit of the aircraft to a maintenance crew, describing pre-cooler health status.

The onboard health management subsystem 276 receives, via a bus 282, data from a plurality of air supply control systems 284, including a pre-cooler HPS valve control system 286, a pre-cooler FAM valve control system 288, a pre-cooler PRS valve control system 290, and from ECS pre-cooler control logic 292. The onboard health management subsystem 276 also receives information from other systems 294 pertaining to other components of the aircraft. In the present configuration, pre-cooler health management may be an integral part of the onboard health management subsystem 276 along with other member systems 294. The pre-cooler health management system 280 communicates with the onboard health management subsystem 276. The system 280 may also receive operational data in approximately real time from the onboard health management subsystem 276. The system 280 analyzes the operational data relative to a set of pre-cooler operational characteristics to determine the pre-cooler health status. Based on the pre-cooler health status, the pre-cooler health management system 280 predicts a failure of the pre-cooler and reports the prediction to the onboard health management subsystem 276. The subsystem 276 may transmit pre-cooler health information in ACMS reports to the ground subsystem 278. Additionally or alternatively, pre-cooler health information may be included in QAR data downloaded to the ground subsystem 278.

Figure 7:
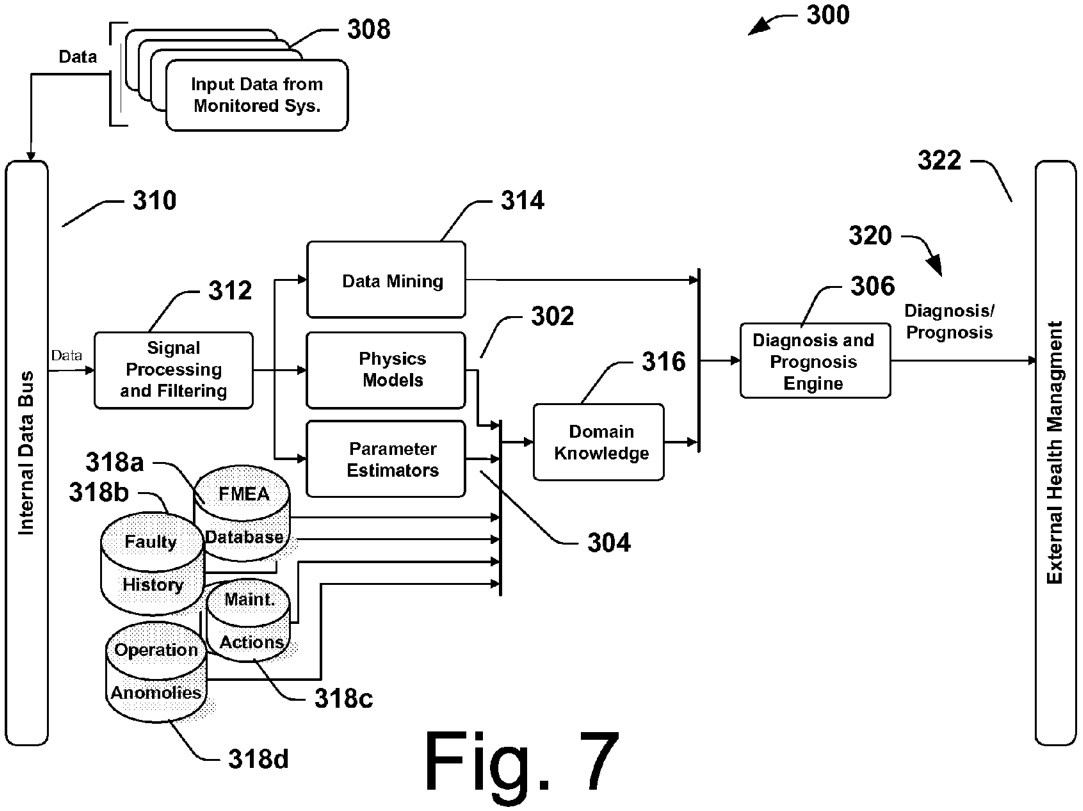
FIG. 7 is a diagram of an exemplary architecture for a health management system in accordance with another implementation of the present disclosure.

An exemplary architecture for a health monitoring system 300 is shown in FIG. 7. Generally, the health monitoring system 300 may process and mine both real time data and recorded data in conjunction with physics models 302 and parameter estimators 304 which are further fed to a diagnosis and prognosis engine 306 where reasoning is conducted to assess the health of a monitored system, sub-system, or component. In various alternate embodiments, the health monitoring system 300 may be used for monitoring the health of systems, subsystems, and components of a wide variety of applications, including manned and unmanned aircraft, trains, subways, spacecraft, automobiles, trucks, military vehicles (e.g. tanks, launchers, and other ground-based vehicles), surface and sub-surface boats and watercraft, construction and manufacturing equipment, medical and dental equipment, and any other suitable applications. More specifically, in the context of health monitoring of an aircraft engine pre-cooler, the health monitoring system 300 may serve as any of those pre-cooler health monitoring systems 210, 240, 280 of FIGS. 4 through 6.

In the embodiment shown in FIG. 7, the health monitoring system 300 receives input data 308 regarding the particular system being monitored via an internal data bus 310. For example, in the event that the monitored system is an engine pre-cooler, the input data 308 may include ACMS reports, QAR data, or other suitable input data. A signal processing and filtering component 312 receives the input data 308 and performs any desired conditioning of the input data 308 in preparation for analysis. After conditioning, the input data 308 may be received by one or more of a data mining component 314, a physics model component 302, and a parameter estimator component 304.

As noted above, the data mining component 314 may clean and preprocess the input data using known tools and routines (e.g. min, max, average, filtering, etc.) to provide improved or enhanced data to the diagnosis and prognosis engine 306. The physics models component 302 includes one or more pre-developed diagnostic models of the monitored system. For example, as noted above, the physics models component 302 may include embodiments of graphical probabilistic models known as Bayesian networks. The physics models component 302 may advantageously capture relations between diagnostic observations and component failure modes.

Figure 8:
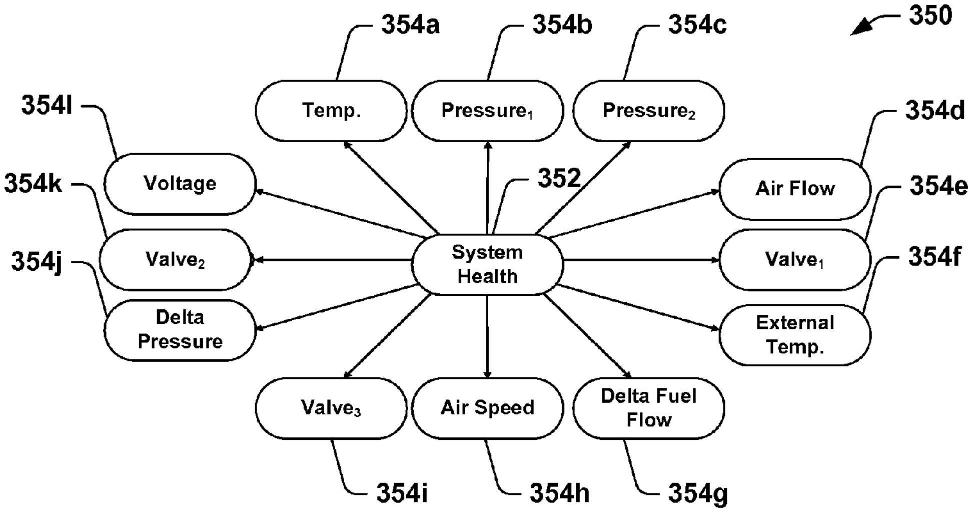
FIG. 8 is a simplified diagram of a system health model have a variety of system variables that contribute to system health.

The parameter estimator component 304 determines a weighting factor to apply to each variable of the monitored system that contributes to system health. For example, FIG. 8 is a simplified view of a system health model 350. In this example, a system health 352 of a monitored system is shown in a central portion of the figure. A plurality of relevant diagnostic observations 354 that may be used in a health monitoring model as disclosed herein are distributed about the system health 352. Each of the diagnostic observations 354 has associated parameters (not shown) specifying weights of the dependence of the system health 352 on that particular diagnostic observation 354, as determined by the parameter estimator component 304.

As further shown in FIG. 7, a domain knowledge component 316 receives information from the physics models component 302 and the parameter estimator component 304, as well as from one or more databases 318. In this exemplary embodiment, the databases 318 include a failure modes and effects analysis (FMEA) database 318*a*, a faulty history database 318*b*, a maintenance actions database 318*c*, and an operation anomalies database 318*d*. Of course, in alternate embodiments, other databases 318 may be used, or the databases 318 may be omitted. The domain knowledge component 316 receives the inputs from the databases 318 and the components 302, 304, and may combine these inputs to create, debug, evaluate, and update portions of the diagnostic models (e.g. portions of layered Bayesian networks) from these input data, as described, for example, in *Methodology and Tools for Rapid Development of Large Bayesian Networks*, by T. C. Lu and K. W. Przytula, 16th International Workshop on the Principles of Diagnosis (DX-05), 2005, or *Evaluation of Bayesian Networks under Diagnostics* by K. W. Przytula, D. Dash, and D. Thompson, Proceedings of the 2003 IEEE Aerospace Conference, 2003, or *Collaborative Development of Large Bayesian Networks* by K. W. Przytula, G. Isdale, and T. C. Lu, Proceedings of the 2006 AUTOTESTCON, 2006, which references are incorporated herein by reference.

The diagnosis and prognosis engine 306 may receive output from the data mining component 314 and the domain knowledge component 316, and uses a probabilistic reasoning engine to derive the likelihood of a system or component failure given the state of the diagnostic observations. The diagnosis and prognosis engine 306 may use formulae as shown in Equation (2) above to provide a probability of failure given the observation states. A system diagnosis or prognosis 320 provided by the diagnosis and prognosis engine 306 is transmitted to an external health management system 322 for further analysis and appropriate action.

Figure 9:
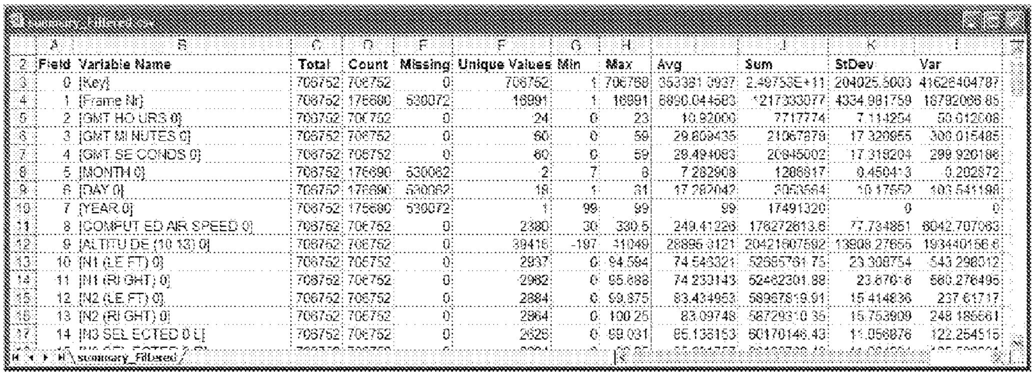
FIG. 9 is a screenshot of quick access recorder (QAR) variables in a summary format in accordance with one implementation of the disclosure.

As mentioned above, health management systems may be implemented using a set of pre-determined operational characteristics. For example, in a particular embodiment, precooler health management may be implemented using a set of pre-cooler operational characteristics. Various analytical methods, including but not limited to sensitivity analysis and/or modeling, may be used to determine such characteristics. For example, in one implementation, over 700,000 data records covering 113 QAR data variables from 56 actual flights of a Boeing 777 aircraft were analyzed to obtain a set of pre-cooler operational characteristics. FIG. 9 shows a sample screen shot 360 of some QAR variables in a summary format that may be used to pre-determine operational characteristics of an aircraft system or component (e.g. an engine pre-cooler of an aircraft ECS).

Figure 10:
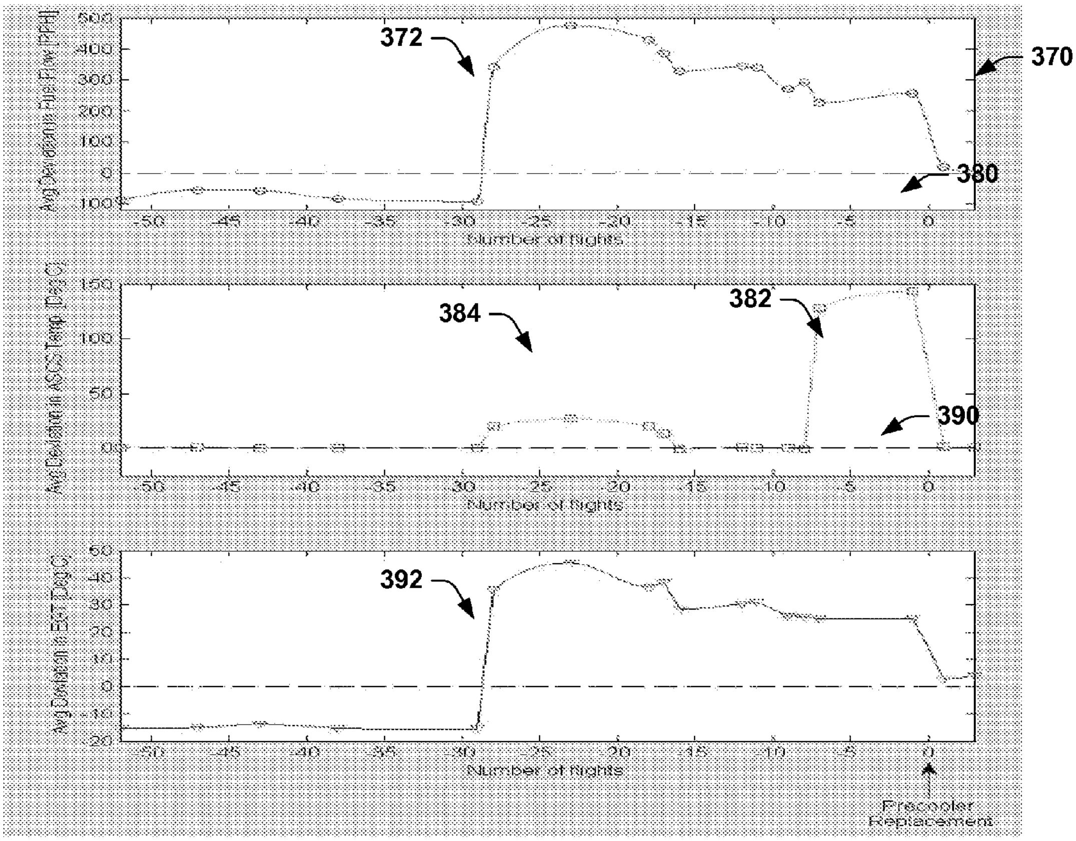
FIG. 10 shows graphs of time domain analyses for verification of pre-cooler health management in accordance with another implementation of the disclosure.

Detailed time-domain analysis of the above-mentioned data (FIG. 9) has suggested that some of the QAR variables are signifiers of an aircraft system's health status. For example, FIG. 10 shows graphs 370, 380, 390 of exemplary time-domain analyses of actual flight data for a passenger aircraft (i.e. a Boeing 777). Specifically, in an exemplary analysis, a sudden change of behavior an engine pre-cooler of an aircraft ECS was observed approximately twenty-one (21) consecutive flights before a pre-cooler failure (occurring at 382 of graph 380). The sudden change of behavior was observed as: (1) average deviation in fuel flow 372 changed by about 500 PPH (parts per hundred), (2) average deviation in exhaust gas temperature (EGT) 384 changed by about 50 degrees C., and (3) average deviation in air supply and control system (ASCS) temperature 392 changed by about 25 degrees C. These detailed time-domain analyses also suggest that pre-cooler failure can be detected by a significant sudden change of system behavior, observed as average deviation in ASCS temperature changed by about 140 degrees C., signifying a possible crack in the pre-cooler. Such observations can be useful in formulating a schedule for replacement of a pre-cooler prior to failure.

Figure 11:
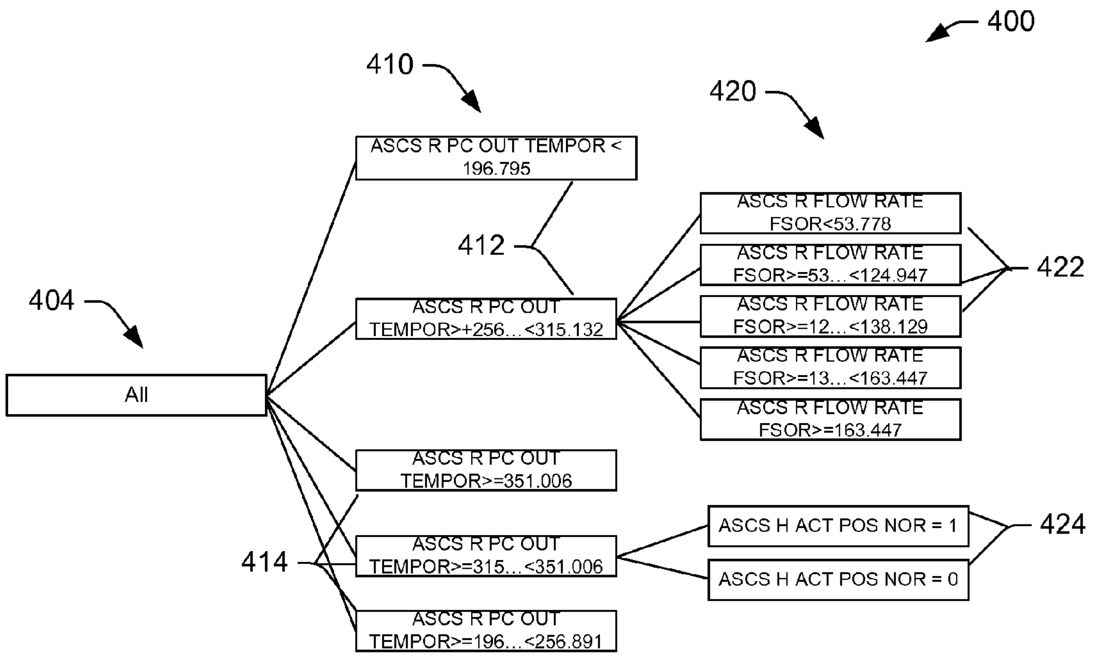
FIG. 11 is a high-level block diagram of a decision tree diagnostic model in accordance with one implementation of the disclosure.

To validate the results of the time-domain analysis as described above, additional independent data mining and diagnostic model analyses (e.g. Bayesian Network analyses) may be conducted to compare the results. Accordingly, a decision tree and Bayesian network-based diagnosis and prediction models were developed to provide pre-cooler failure diagnosis/prognosis. More specifically, a high-level diagnostic decision tree model 400 is shown in FIG. 11. In this embodiment, the diagnostic decision tree model 400 includes a first level node 404 that begins the decision tree process for all possible values of all possible variables. At a second level 410, a plurality of nodes 412, 414 represent possible ranges (or values) of one or more first variables upon which the health of a monitored system may depend, and a third level 420 includes a plurality of nodes 422, 424 that represent possible ranges (or values) of one or more second variables upon which the health of the monitored system may depend.

For example, in the embodiment shown in FIG. 11, for monitoring an engine pre-cooler of an aircraft ECS, the nodes 412 of the second level 410 may represent different ranges of an ASCS temperature (e.g. <196.795°R, >=256°R and <315.132°R, etc.), and the nodes 414 may represent still other ranges of the ASCS temperature (e.g. >351.006° R, >=315.132° R and <351.006° R, >=196° R and <256.891° R, etc.). Similarly, and the nodes 422 of the third level 420 may represent different ranges of an ASCS flow rate (e.g. <53.778, >=53.778 and <124.947, >=124.97 and <138.129, >=138.129 and <163.477, >=163.477, etc.), while the nodes 424 may represent different ranges (or values) of an HPS valve position (e.g. 1, 0, etc.).

Figure 12:
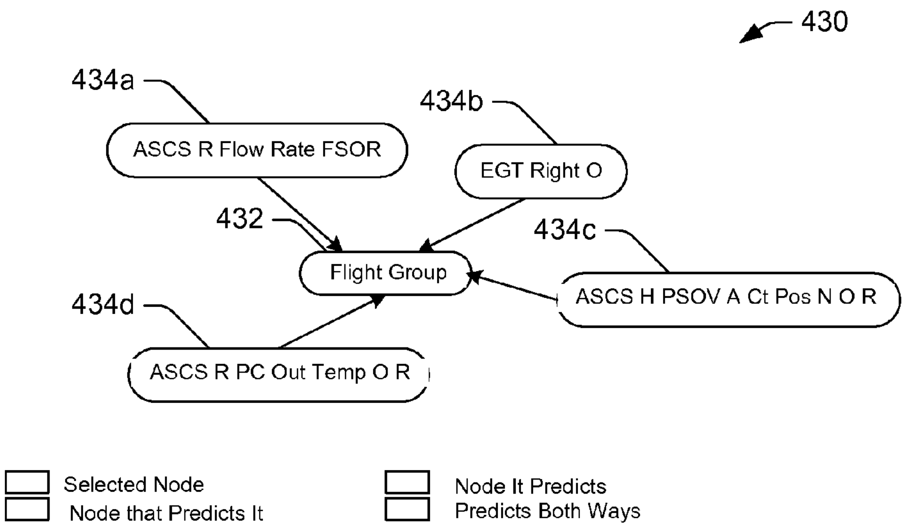
FIGS. 12 and 13 are high-level block-diagrams of Bayesian diagnostic models in accordance with further implementations of the present disclosure.
Figure 13:
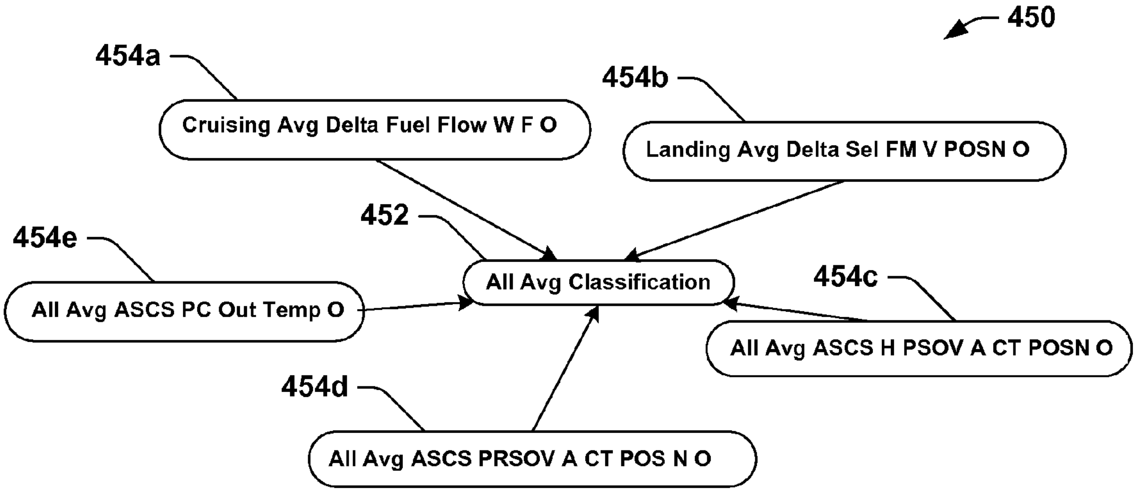

FIGS. 12 and 13 are high-level block-diagrams of diagnostic Bayesian models 430, 450 in accordance with embodiments of the present disclosure. More specifically, FIG. 12 depicts a model 430 for diagnostic reasoning over raw signals from the data records. In this embodiment, a selected node 432 (e.g. flight group) is selected for diagnostic analysis, and a plurality of predictor nodes 434 (e.g. ASCS flow rate, EGT right, ASCS outlet temperature, ASCS HPS valve position, etc.) are identified that contribute to a diagnostic prediction of a failure (or non-failure) of that selected node 432. The diagnostic model 430 then uses a reasoning engine to combine and evaluate a probability of failure of the selected node 432 based on the values and conditions of the predictor nodes 434.

Alternately, FIG. 13 depicts a diagnostic model 450 that does per-flight diagnosis over signals which are obtained by averaging of raw signals for each flight. In this embodiment, a selected node 452 (e.g. All Avg. classification) is selected for diagnostic analysis, and a plurality of predictor nodes 454 (e.g. Cruising Avg. Delta Fuel Flow, Landing Avg. Delta FM valve position, All Avg. ASCS HPS valve position, All Avg. ASCS PRS valve position, All Avg. ASCS Output Temperature, etc.) are identified that contribute to a diagnostic prediction of a failure (or non-failure) of that selected node 452. Again, the diagnostic model 450 uses a reasoning engine to combine and evaluate a probability of failure of the selected node 452 based on the values and conditions of the predictor nodes 454.

Testing and validation of the health monitoring systems and methods described above, including the Bayesian diagnosis models, confirmed that embodiments of systems and methods in accordance with the present disclosure may accurate predict and detect failure of a monitored system or component. In some embodiments, the validation results indicated essentially the same conclusions as obtained using time-domain analysis.

In addition, since the Bayesian diagnosis model may provide different classes of health of a monitored system, it may advantageously be used to provide a capability to accurately predict an imminent failure of the monitored system. Various embodiments of Bayesian diagnosis models may provide five different classes of pre-cooler health: (1) healthy monitored system (e.g. pre-cooler); (2) change in system behavior/anomaly detected; (3) further change in system behavior/anomaly detected; (4) monitored system failure; and (5) ground test after replacement.

In a particular case wherein the monitored system included a pre-cooler of an aircraft ECS system of a passenger aircraft, an embodiment of a Bayesian diagnosis/prognosis model predicted pre-cooler failure twenty-one (21) flights prior to the actual event, essentially the same conclusion as that reached by the time-domain analysis described above with respect to FIG. 10. The twenty-one flights predicted in the Bayesian model were in classes (2) and (3) listed above. Accuracy of classification for each of the pre-cooler health classes identified in the model was tested and confirmed by evaluating the model in relation to over 700,000 data records from fifty-six (56) actual flights of a Boeing 777 aircraft.

It should be noted generally that various analytical methods could be used in place of or in addition to the foregoing methods. Many known analytical methods, including but not limited to other or additional modeling techniques, could be used to determine operational characteristics that would be useful in diagnosing health and/or predicting failure of a monitored system or component.

Embodiments of methods and systems in accordance with the teachings of the present disclosure may provide significant advantages. For example, such embodiments may provide unique and adaptable health management architectures that are modular and configurable. The architecture design enables various application-specific implementation schemes to accommodate a variety of different applications which may benefit from health monitoring systems, including most, if not all, in-service and next generation aircraft, as well as trains, subways, spacecraft, automobiles, trucks, military vehicles, surface and sub-surface boats and watercraft, construction and manufacturing equipment, medical and dental equipment, and many other suitable applications. Embodiments of methods and systems in accordance with the present disclosure also provide a capability to predict and detect failure of a monitored system that does not require any manual inspection. In the context of organizations having a large number of vehicles and equipment, such embodiments of health management methods and systems can significantly improve fleet management and cost savings associated with maintenance and repairs. Unscheduled interrupts due to failures can be reduced or avoided, thereby reducing unscheduled removals from service and unexpected costs related to failures.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method to evaluate a condition of an aircraft engine precooler, comprising:

receiving, in a processor-based health management system, a plurality of raw signals indicative of observation states of a plurality of operating variables associated with the aircraft engine precooler; smoothing the plurality of raw signals collected during a flight to obtain a per-flight diagnosis;

performing, in the processor-based health management system, a joint probability analysis of the plurality of signals using a diagnostic model to generate a predictive failure prediction for the aircraft engine precooler; and reporting the predictive failure prediction to an aircraft health management system, wherein performing, in the processor-based health management system, a joint probability analysis of the plurality of signals using a diagnostic model to generate a predictive failure prediction for the aircraft engine precooler comprises:

identifying a plurality of predictor nodes in a predictive failure model; and evaluating a predictive probability of failure based on the plurality of predictor nodes.

2. The method of claim 1, wherein the plurality of signals comprise signals received from at least one of a pre-cooler high pressure shutoff (HPS) valve control system, a pre-cooler fan air modulating (FAM) valve control system, a pre-cooler pressure regulating and shutoff (PRS) valve control system, or ECS pre-cooler control logic.

3. The method of claim 2, wherein at least some of the signals are collected in real-time during operation of the aircraft engine precooler.

4. The method of claim 1, further comprising, prior to performing a joint probability analysis, developing a diagnostic model of the monitored system that determines a probability of failure based on one or more observation states of the plurality of operating variables.

5. The method of claim 4, wherein the knowledge of the monitored system includes at least one of a component reliability and a component weighting factor of a component of the monitored system.

6. The method of claim 1, wherein performing a joint probability analysis of the plurality of signals includes performing a joint probability analysis of the plurality of signals using a Bayesian network.

7. The method of claim 6, wherein performing a joint probability analysis includes performing a joint probability analysis to determine a probability of component failure based on a joint probability distribution over the plurality of signals indicative of observation states of the plurality of operating variables.

8. The method of claim 7, wherein the Bayesian network comprises a layered Bayesian network.

9. The method of claim 1, wherein receiving a plurality of signals includes receiving operational data from the monitored aircraft system.

10. The method of claim 1, wherein the onboard system of the aircraft includes an engine bleed pre-cooler of an environmental control system, the method further comprising predicting a failure of the pre-cooler based on a change in at least one of an average deviation in fuel flow, an average deviation in exhaust gas temperature (EGT), and an average deviation in air supply and control system (ASCS) temperature.

11. The method of claim 1 embodied in computer-readable instructions at least one of stored on a computer-readable storage medium and transmitted in real time.

12. A processor-based system to evaluate a condition of an aircraft engine precooler, comprising:

an input component configured to receive a plurality of raw signals associated with the aircraft engine precooler indicative of observation states of a plurality of operating variables; and an analysis component coupled to the input component and configured to: smooth the plurality of raw signals collected during a flight to obtain a per-flight diagnosis;

perform a joint probability analysis of the plurality of signals using a diagnostic model to generate a predictive failure prediction for the aircraft engine precooler; and report the predictive failure prediction to an aircraft health management system;

identify a plurality of predictor nodes in a predictive failure model; and evaluate a predictive probability of failure based on the plurality of predictor nodes.

13. The system of claim 12, wherein the plurality of signals comprise signals received from at least one of a pre-cooler high pressure shutoff (HPS) valve control system, a pre-cooler fan air modulating (FAM) valve control system, a pre-cooler pressure regulating and shutoff (PRS) valve control system, or ECS pre-cooler control logic.

14. The system of claim 13, wherein at least some of the signals are collected in real-time during operation of the aircraft engine precooler.

15. The system of claim 12, wherein the analysis component is further configured to perform the joint probability analysis using a Bayesian network.

16. The system of claim 12, wherein the monitored system includes an engine bleed pre-cooler of an aircraft environmental control system, and wherein the analysis component in further configured to predict a failure of the pre-cooler based on a change in at least one of an average deviation in fuel flow, an average deviation in exhaust gas temperature (EGT), and an average deviation in air supply and control system (ASCS) temperature.

* * * * *